2,734,012
Patented Feb. 7, 1956

2,734,012

WEFTLESS RIBBONS AND PROCESS FOR FORMING SAME

John Downing, Spondon, near Derby, England, assignor to British Celanese Limited, a corporation of Great Britain No Drawing. Application June 22, 1953, Serial No. 363,404

Claims priority, application Great Britain July 15, 1952

6 Claims. (Cl. 154—92)

This invention relates to adhesives for cellulose acetate and to weftless ribbons and other products in which cellulose acetate is bonded to water-insoluble cellulosic material by means of said adhesives. The term "water-insoluble cellulosic material" is used herein to designate material comprising cellulose (including regenerated cellulose) and water-insoluble substitution derivatives thereof.

I have found that ribbons particularly suitable for tying up small packages, e. g. chocolate boxes, for display and sale can be formed from a narrow warp of cellulose acetate yarns, or of cellulose acetate yarns together with cellulose yarns, by bonding the yarns together by means of a polymer capable of forming flexible films and of dissolving in an aqueous liquid that is not a solvent or strong swelling agent for cellulose acetate, together with diethylene glycol diacetate in a proportion suitable for plasticizing the polymers. Adhesives of this nature are thought to be novel compositions and the invention includes these adhesives as well as composite materials comprising a cellulose acetate material and a water-insoluble cellulosic material bonded together by means of such an adhesive.

In making ribbons according to the invention particularly valuable results have been obtained by using as the adhesive an aqueous solution of polyvinyl alcohol plasticized with 50 to 100% of its weight of diethylene glycol diacetate, the adhesive being applied at a temperature of 20 to 70° C. in amount sufficient to leave on the warp 15 to 25% by weight of the mixture of polyvinyl alcohol and diglycol diacetate, and the coated warp being dried at a temperature below 100° C. so as to remove substantially all the water but little or none of the diglycol diacetate. Various grades of polyvinyl alcohol have been used; the best results have been obtained with a medium-viscosity product made from a suspension polymerized vinyl acetate and designated "U. W. 10" (Alexander Wacker A. G.).

The following examples, in which all the parts are by weight, illustrate the invention:

Example 1

A travelling warp ½" wide and composed of 80 ends of coloured cellulose acetate yarn of 150 denier and 5 to 10 turns per inch was coated with a solution of the following composition:

100 parts of polyvinyl alcohol
80 parts of diethylene glycol diacetate
720 parts of water
0.5 part of a cotton dye to match the colour of the yarn, the coating being effected at a temperature of 60° C. and so as to leave on the material its own weight of the solution. The coated warp was carried through a drying chamber maintained at 70° C. where the greater part of the water was evaporated without substantial removal of the diethylene glycol diacetate. The partially dried ribbon was passed through a three-bowl polishing calender, the inlet and outlet bowls being maintained at 90 and 100° C. respectively. The dried ribbon was wound up and was then ready for use. It was of good tenacity, attractive lustre and would withstand flexing.

Example 2

The process was carried out as in Example 1 except that the warp was composed of alternate ends of cellulose acetate yarn and of regenerated cellulose yarn dyed in contrasting colours and the dye was omitted from the adhesive composition.

Instead of forming the ribbons from narrow warps of yarn as described above, a much wider warp can be used to form a coated sheet which can then be slit to form ribbons of the desired width.

Instead of polyvinyl alcohol, other water-soluble polymers capable of giving flexible films can be used. Such polymers include polyacrylic acid and various water-soluble cellulose derivatives among which mention may be made of methyl cellulose, methyl ethyl cellulose and oxyethyl methyl cellulose. It is not essential for the polymer to be water-soluble provided that it be soluble in aqueous liquids which are not solvents or strong swelling agents for the cellulose acetate. Thus, for example, incompletely saponified polyvinyl acetate can be used, for instance in solution in aqueous alcohol.

As the plasticizer, diethylene glycol diacetate was adopted after trials with a number of other possible plasticizers had shown it to be particularly valuable, especially in respect of the strong adhesion it gives between cellulose acetate and the polymer, and of the elasticity of the coating, which is an important factor in giving good lateral strength to weftless fabrics.

Ornamental effects may be obtained on the weftless fabrics of the invention by various means. The yarns may be of various colours, which may or may not be uniform along the length of any yarn. The adhesive may contain soluble or insoluble colouring agents or dispersed metallic powders. The ribbons may be embossed, printed, crimped or metalized.

The compositions of the invention can be used quite generally in bonding cellulose acetate materials to water-insoluble cellulosic materials, including materials of cellulose acetate itself and materials composed of or containing: natural cellulose, e. g., cotton, linen, wood pulp and paper; regenerated cellulose, whether in fibrous or non-fibrous form; other cellulose esters, especially other esters of carboxylic acids containing two to four carbon atoms in the molecule, e. g., cellulose propionate, cellulose butyrate, cellulose acetate-propionate and cellulose acetate-butyrate; and cellulose ethers, e. g., ethyl cellulose and benzyl cellulose. The adhesives of the invention are particularly suitable for use with cellulose esters and ethers in which the degree of substitution is less than three, e. g., between 2 and 2.75. With cellulose acetate, for instance, the acetyl value (expressed as acetic acid) is preferably between 52 and 54%. The adhesives may be used, however, with more highly substituted esters and ethers, e. g., with cellulose acetates of acetyl value from 54 to 56% or even above 56%. The adhesives are specially suitable for use in making flexible products by bonding together components of cellulose acetate or of cellulose acetate and another water-insoluble cellulosic material, each of which is in the form of staple-fibres, continuous filaments, yarns, fabrics or foils. Thus, for example, attractive packaging materials can be formed by bonding cellulose acetate fabrics, yarns or staple-fibres to paper or to fabrics or foils of cellulose acetate or regenerated cellulose.

The water resistance of the products of the invention can be increased if so desired by the application of suitable agents, e. g. formaldehyde or glyoxal, adapted to combine with hydroxy groups in the polymer.

Having described my invention, what I desire to secure by Letters Patent is:

1. An unwoven fabric consisting of a web of parallel yarns all of which are composed of materials selected from the class consisting of cellulose and cellulose acetate and at least some of which are composed of cellulose acetate, bonded together by means of polyvinyl alcohol plasticized with diethylene glycol diacetate.

2. An unwoven fabric consisting of a web of parallel yarns of cellulose acetate and of cellulose, bonded together by means of polyvinyl alcohol plasticized with diethylene glycol diacetate.

3. An unwoven fabric consisting of a web of parallel yarns of cellulose acetate, bonded together by means of polyvinyl alcohol plasticized with diethylene glycol diacetate.

4. Process for forming a weftless ribbon which comprises bonding together the yarns of a warp consisting of parallel yarns of materials selected from the class consisting of cellulose and cellulose acetate and at least some of which are composed of cellulose acetate, to form a self-supporting web, by means of an aqueous solution of polyvinyl alcohol plasticized with 50 to 100 percent of its weight of diethylene glycol diacetate, and evaporating the water at a temperature below 100° C.

5. Process for forming a weftless ribbon which comprises bonding together the yarns of a warp consisting of parallel yarns of cellulose acetate and of cellulose, to form a self-supporting web, by means of an aqueous solution of polyvinyl alcohol plasticized with 50 to 100 percent of its weight of diethylene glycol diacetate, and evaporating the water at a temperature below 100° C.

6. Process for forming a weftless ribbon which comprises bonding together the yarns of a warp consisting of parallel yarns of cellulose acetate, to form a self-supporting web, by means of an aqueous solution of polyvinyl alcohol plasticized with 50 to 100 percent of its weight of diethylene glycol diacetate, and evaporating the water at a temperature below 100° C.

References Cited in the file of this patent

UNITED STATES PATENTS

| Number | Name | Date |
| --- | --- | --- |
| 2,070,331 | Derby | Feb. 9, 1937 |
| 2,344,457 | Christ | Mar. 14, 1944 |
| 2,399,401 | Sonnischen | Apr. 30, 1946 |
| 2,626,883 | Boese | Jan. 27, 1953 |
| 2,644,779 | Manning | July 7, 1953 |